E. C. OLIVER.
FLEXIBLE SHAFT.
APPLICATION FILED APR. 22, 1907.
910,014.
Patented Jan. 19, 1909.
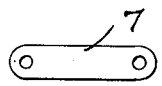
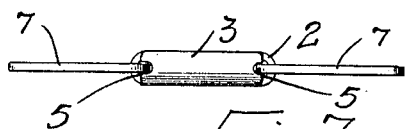
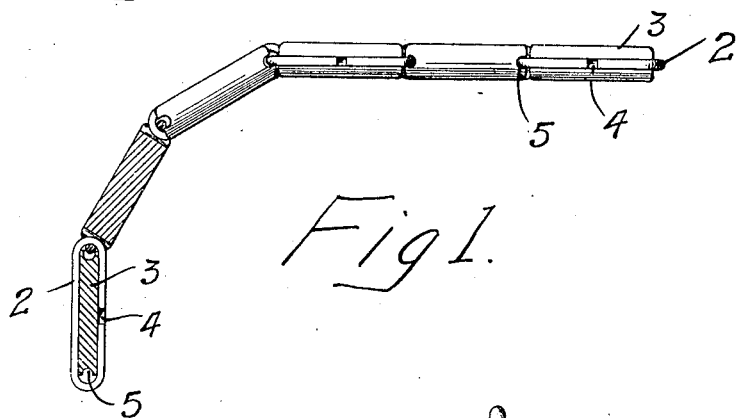
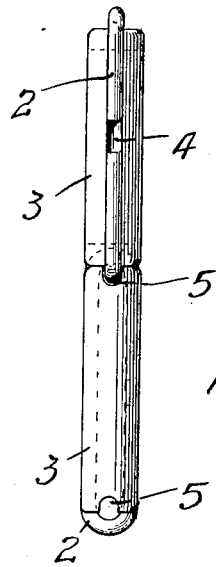
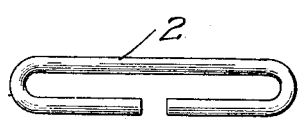
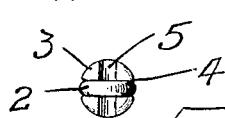
WITNESSES
INVENTOR
EDD C. OLIVER
BY
HIS ATTORNEYS

UNITED STATES PATENT OFFICE.

EDD C. OLIVER, OF MINNEAPOLIS, MINNESOTA.

FLEXIBLE SHAFT.

No. 910,014.  Specification of Letters Patent.  Patented Jan. 19, 1909.

Application filed April 22, 1907. Serial No. 369,416.

*To all whom it may concern:*

Be it known that I, EDD C. OLIVER, of Minneapolis, Hennepin county, Minnesota, have invented certain new and useful Improvements in Flexible Shafts, of which the following is a specification.

The object of my invention is to provide a flexible shaft of simple, economical construction and one which will be very effective for the purpose designed.

A further object is to provide a flexible shaft adapted particularly for use in connection with the speedometer of a self-propelled vehicle.

My invention consists generally in a flexible shaft composed of a series of links having recesses in their ends to receive the ends of contiguous links, whereby they will be braced against a twisting strain.

Further, the invention consists in various constructions and combinations, all as hereinafter described and particularly pointed out in the claims.

In the accompanying drawings, forming part of this specification, Figure 1 is a view of a flexible shaft embodying my invention. Fig. 2 is a detail view showing the manner of interlocking the links with the fillers. Fig. 3 is a detail of one of the links. Figs. 4 and 5 are detail views of the filler. Fig. 6 is an end view of the same. Fig. 7 is a view illustrating a modification in the construction of the shaft. Fig. 8 is a detail view of a modification in the form of link employed.

In the drawing, I have shown the shaft composed of a series of elongated links 2 composed preferably of steel wire of suitable gage, and open on one side as indicated, or closed if preferred, to form continuous unbroken links. These links are of suitable size according to the character of the work to be performed, and each link interlocks with the contiguous one to form a continuous chain of any desired length. Within each link a filler 3, preferably metallic, is inserted and having longitudinal grooves 4 on each side extending from end to end of the filler. The ends of the filler are flattened so that sufficient space is left at the ends of each link to allow free movement of the contiguous link interlocking therewith. This space will, of course, be varied according to the cross sectional area of the links. Grooves 5 are formed in each end of the filler, preferably at right angles to the grooves 4, and the grooves 5 are adapted to receive the ends of contiguous links and permit the ends of the fillers to contact with one another, and when such contact takes places the side walls of the grooves 5 will, when a twisting strain is applied to the shaft, brace the ends of the links and allow the power to be transmitted in an irregular line and with substantially the same efficiency as though the fillers were formed in one continuous piece. The walls of the grooves will support the links, and lateral movement thereof which would tend to push them out of their grooves in the fillers, will be positively prevented.

The links will be in planes substantially at right angles to one another, and the grooves in the ends of the fillers will be correspondingly placed and when the ends of the links enter the grooves in the contiguous fillers, the wires composing the links will be firmly braced and the movement of the shaft transmitted with comparatively little lost motion.

The fillers will, of course, be varied in size and shape according to the character of the link and the angle where the shaft is to be used.

In Figs. 7 and 8 I have illustrated a modification in the construction of the shaft which consists in interposing flat links 7 therein at intervals having ends that are adapted to enter the grooves in the contiguous ends of the adjoining fillers.

The construction of shaft illustrated in Fig. 7 will serve to transmit power and be suitable in connection with a speedometer, but is not as substantial as the shaft illustrated in Fig. 1, as the bearings for the links interlocking with the flat links 7, are omitted. A flexible shaft of this type will be of economical construction and having but little lost motion between its sections is particularly adapted for use with a speedometer where quick and accurate transmission of the movement of the wheel to the indicator is desired.

I claim as my invention:

1. In a flexible shaft, a skeleton link and a filler therein, said filler extending from end to end of the link, and having grooves or recesses in its ends, to receive the ends of contiguous links.

2. A flexible shaft comprising a series of skeleton links, and fillers inclosed by said links, the ends of the links projecting beyond the ends of the fillers, and the fillers having grooves to receive said ends for the purpose specified.

3. A flexible shaft comprising a series of links interlocking with one another, and fillers having recesses in their ends to receive the ends of contiguous links, the ends of the links projecting beyond the ends of the fillers.

4. A flexible shaft comprising a series of links, and fillers within said links having transverse grooves in their ends to receive the ends of contiguous links and brace the same when a twisting strain is applied thereto, the ends of the links projecting beyond the ends of the fillers.

5. A flexible shaft comprising a series of links interlocking with one another, and fillers having longitudinal grooves to receive said links, the ends of said links projecting beyond the ends of said fillers, and said fillers having transverse grooves in their ends to receive the ends of contiguous links and brace the same against a twisting strain.

6. A flexible shaft comprising a series of wire links interlocking with one another and elongated in form, and fillers fitting within said links and having transverse recesses in their ends to receive the ends of said links and whereby the said links will be braced when a twisting strain is applied to the shaft, the ends of the links projecting beyond the ends of the fillers.

7. A flexible shaft comprising a series of wire links interlocking with one another, fillers fitting within said links and having longitudinal grooves, and transverse grooves in their ends at right angles substantially to said first named grooves, and said transverse grooves being adapted to receive the ends of the links and thereby brace them against a twisting strain.

8. A flexible shaft comprising a series of links, and fillers fitting within said links, the ends of the links projecting beyond the ends of the fillers and the fillers having recesses in their ends of sufficient width to allow the entrance of the ends of the links and permit the fillers to contact one with another, and the walls of said grooves engaging the links and bracing the same against a twisting strain on the shaft.

9. A flexible shaft comprising a series of flat links connected together, the adjoining links being in planes substantially at right angles to one another, and fillers for said links, the ends of the links projecting beyond the ends of the fillers and the fillers having grooves in their outer ends to receive the ends of the contiguous links whereby when a twisting strain is applied to the shaft the walls of the grooves will brace and support the links, substantially as described.

In witness whereof, I have hereunto set my hand this 18th day of April 1907.

EDD C. OLIVER.

Witnesses:
RICHARD PAUL,
J. B. ERA.